Figure 1:
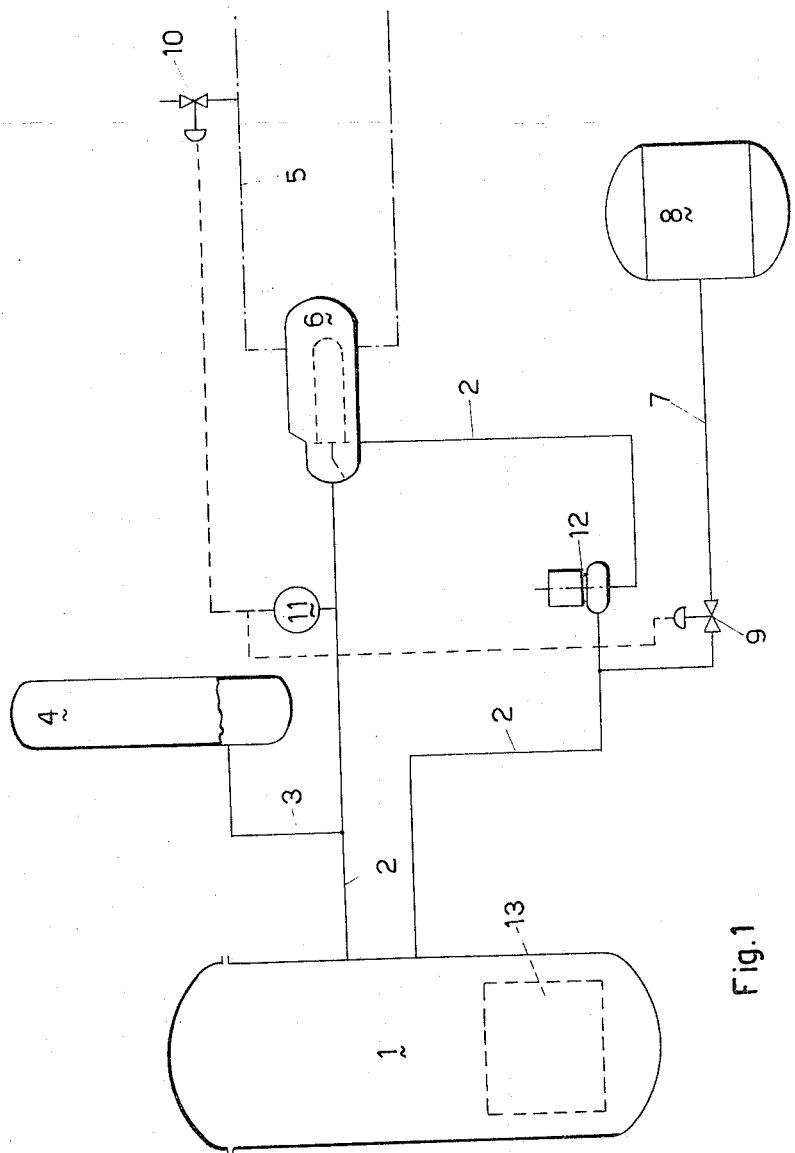

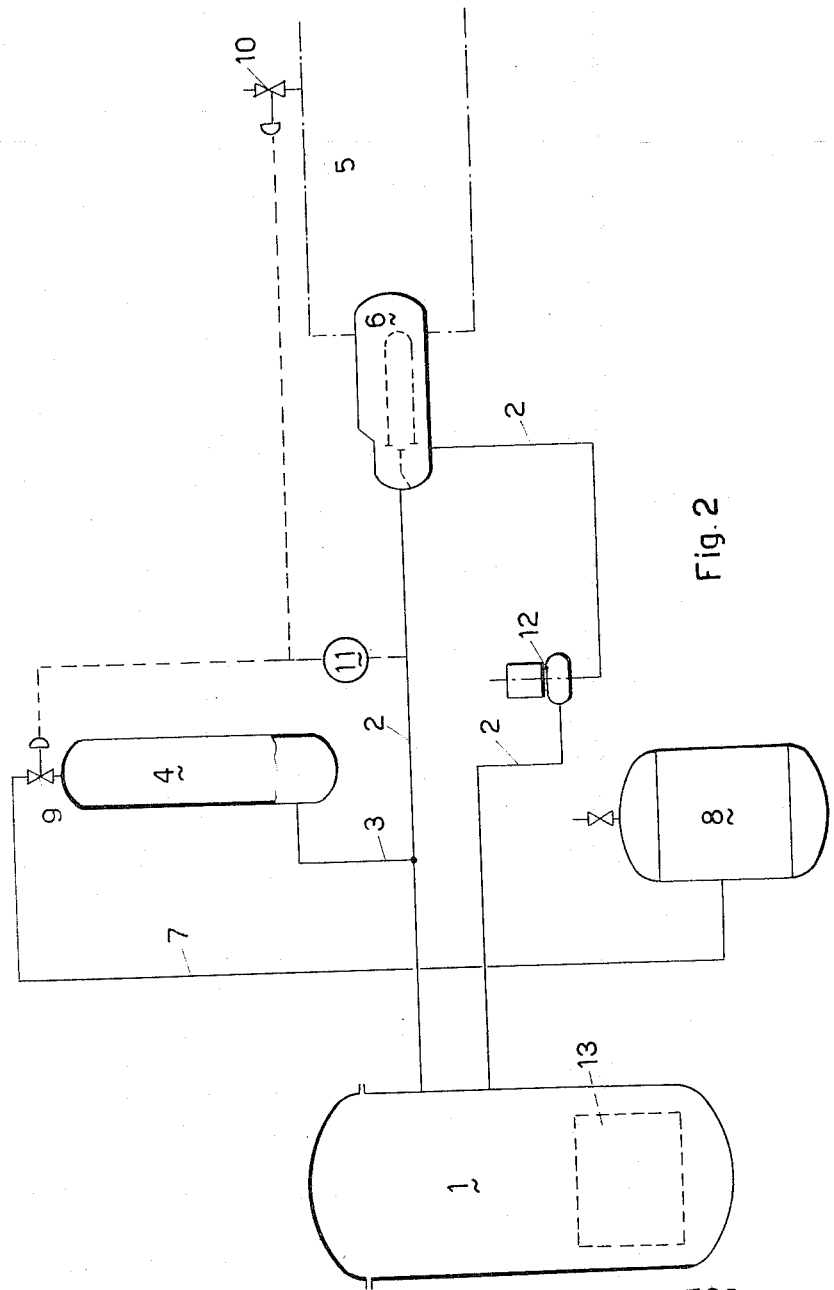

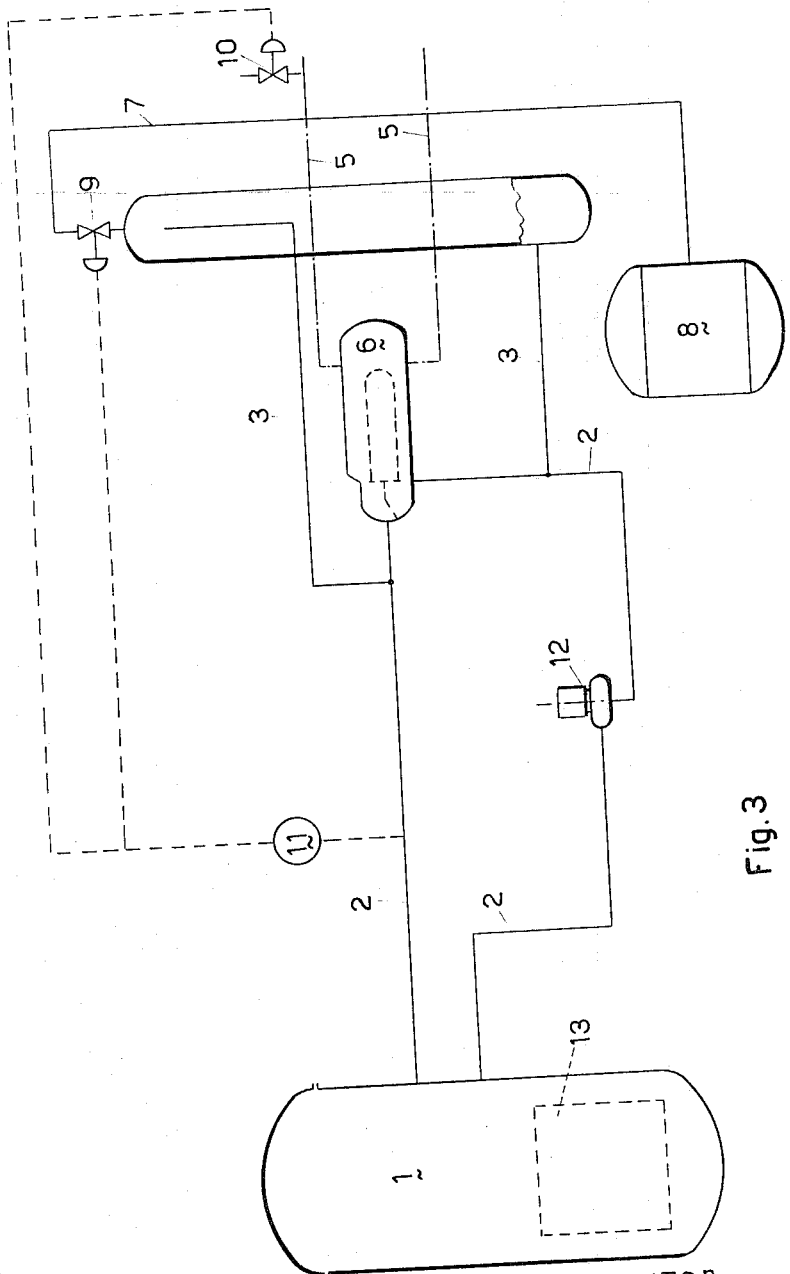

United States Patent Office 3,291,695
Patented Dec. 13, 1966

3,291,695
DEVICE FOR REDUCING THE OVERPRESSURES CAUSED BY FAILURES OF THE HEAT EXCHANGER IN TWO LOOPS PRESSURIZED ORGANIC COOLED NUCLEAR REACTOR PLANT
Elio Merli, Rome, Italy, assignor to Comitato Nazionale per l'Energia Nucleare, Rome, Italy
Filed Dec. 16, 1963, Ser. No. 330,766
Claims priority, application Italy, Feb. 6, 1963, 664,390
2 Claims. (Cl. 176—20)

In the organic cooled and/or moderated reactors, the primary cooling loop is usually designed for a lower pressure than the secondary one, in which water is flowing.

However, the organic fluid temperature, owing to its low vapour pressure at the usual operating temperatures, can be much higher than that of the saturated water vapour.

Therefore, the design and operating requirements of the two cooling loops (primary and secondary) are quite different: the first is a high temperature, low pressure system in which an organic fluid such as diphenyl or triphenyl circulates; the second one is a high pressure and relatively low temperature system, in which water circulates. The two cooling loops have, as well known, a joint section that is the heat exchanger.

Therefore a failure occurring inside the exchanger will cause a rushing flow of water towards the organic fluid owing to the higher pressure in the water loop than in the organic loop.

At the same time the water, streaming from the secondary to the primary loop and getting in touch with the organic fluid, will remove heat from the organic fluid which is at a higher temperature than water is.

This heating of the water can cause it to flash and, as a consequence, a very large and sudden increase in pressure can occur inside the primary loop which, for economical reasons, as indicated above, is designed to withstand a pressure which, though higher than the operating pressure with organic fluids, is nevertheless lower than that liable to be reached as a consequence of the described failure.

Therefore, the arrangement which is the object of this invention is intended for reducing these pressure increases so that the maximum overpressure that can be reached as a consequence of such failure will be lower than the design pressure of the primary loop.

In order to make this invention more clearly understandable and readily applicable some embodiments of it are hereafter described as non-limiting examples thereof with reference to the attached drawings.

FIGURES 1, 2 and 3 are diagrams illustrating three different embodiments of the construction of the present invention.

The arrangement which is the object of this invention is shown in FIG. 1. Primary cooling loop 2, including pressure vessel 1, in which fuel elements 13 are contained, heat exchanger 6 and circulating pump 12, is connected, through suitably dimensioned piping 3, to expansion vessel 4 which, when normally operating, is kept full with gas, and through suitably dimensioned piping 7—the latter being provided with valve 9 which is closed when normally operating and sets open when actuated by a pressure-signal originating from the primary loop—to suitably dimensioned drain tank 8.

Furthermore in piping 5 valve 10 is inserted which vents to the atmosphere and which too is controlled by a pressure signal originating from the primary loop.

This arrangement operates as follows: In case of failure inside heat exchanger 6, water which finds its way towards primary loop 2, will cause therein a pressure increase which can be made gradual with time by suitably dimensioning vessel 4.

When the pressure in the primary loop reaches a predetermined value higher than the operating pressure value, but lower than the design pressure value, valves 9 and 10 are opened by a pressure signal originating from pressure sensing device 11.

Valve 9, when open, allows the pressure inside heat exchanger 6 to be reduced and therefore the water flow is reduced through the brakage inside heat exchanger 6 towards primary loop 2.

By suitably dimensioning of valves 9 and vessel 4 one can keep the operating pressure in the primary loop below the design pressure.

The opening of valves 10 allows to reduce pressure in the heat exchanger 6 and therefore to reduce the amount of water flowing in the primary loop in one unit of time through the brakage in the heat exchanger 6.

Valves 9 and 10 close when the pressure in both loops is the same.

Another embodiment of the invention is shown in FIG. 2, in which discharge piping 7 is connected to the top of vessel 4 so that gas only is discharged to vessel 8. Through this embodiment the size of piping 7 can be reduced, which connects the primary loop to drain tank 8.

In FIG. 3, another embodiment is shown, wherein the expansion vessel 4 is connected to the inlet and outlet lines of the heat exchanger, so that vessel 4, when properly dimensioned, can also act as a surge dampener or a pressure waves absorber.

The dimensioning of piping 7 which connects the primary loop to expansion vessel 4 and the dimensioning of the latter are achieved first by assuming that a given failure has occurred within the heat exchanger (for instance a pipe breakage), second by calculating the water flow through the broken pipe towards the primary loop and taking into account its total or partial vaporisation which is a consequence of the fact that, passing from the higher pressure system to the lower pressure one, the leaking water undergoes an expansion and of the fact that in the secondary system a liquid flows whose temperature is much higher than that of the incoming water.

Expansion vessel 4 is so dimensioned that the pressure inside the primary loop will change so slowly with time, that valves 9 and 10 will open before the pressure increase could become dangerous and connecting piping 7 is so dimensioned as to discharge in one time unit a given volume of organic fluid which volume will subsequently be replaced with water vapour so that the pressure increase within the primary system will be stopped.

Though only three embodiments of this invention have been described and shown in the attached drawings, the principle of the invention is suitable for a number of other applications that experienced professionals will be able to devise.

Furthermore, within the concept of the invention many changes and improvements can be introduced in the development thereof, which however are to be considered as included in the basic concepts hereto disclosed.

What I claim is:
1. In a nuclear reactor plant having a primary loop and a secondary loop; a heat exchanger included in both loops, said primary loop further comprising a pressure vessel connected with said heat exchanger, fuel elements in said pressure vessel, a circulating pump connected with said pressure vessel and said heat exchanger, an expansion vessel and a drain tank, an organic fluid being circulated through said primary loop at a high temperature and relatively low pressure and water being circulated through said secondary loop at a lower temperature and a higher pressure than that of said organic fluid; an ap- paratus for reducing excessive pressure produced in said primary loop by failure in said heat exchanger, said apparatus comprising a pressure sensing device, means connecting said pressure sensing device with said primary loop and comprising a remotely controlled valve connected to said drain tank, and means connecting said pressure sensing device with said secondary loop and comprising a remotely controlled valve communicating with the atmosphere, the location of said pressure sensing device in the primary loop enabling it to detect said excessive pressure and to control said valves accordingly, thereby maintaining pressure in the primary loop at a value which is lower than the maximum pressure for which the primary loop was designed.

2. An apparatus in accordance with claim 1, wherein said expansion vessel is connected to the inlet and the outlet of said heat exchanger.

References Cited by the Examiner

UNITED STATES PATENTS

| | | | |
|---|---|---|---|
| 2,658,728 | 11/1953 | Evans | 165—11 X |
| 3,033,538 | 5/1962 | Iddles et al. | |
| 3,034,978 | 5/1962 | Rodin et al. | 176—65 X |
| 3,105,028 | 9/1963 | Long | 176—60 |
| 3,130,129 | 4/1964 | Roche | 176—52 |

FOREIGN PATENTS 862,624  3/1961  Great Britain.

OTHER REFERENCES

Directory of Nuclear Reactors, vol. IV, "Power Reactors," Int. At. Energy Agency, Vienna, Austria, 1962, page 291.

L. DEWAYNE RUTLEDGE, *Primary Examiner.*